United States Patent [19]

Botterill

[11] Patent Number: 5,078,249
[45] Date of Patent: Jan. 7, 1992

[54] GEAR BOX WITH GEARS SHIFTABLE UNDER LOAD

[75] Inventor: John R. Botterill, Saarbrücken, Fed. Rep. of Germany

[73] Assignee: GKN Automotive AG, Siegburg, Fed. Rep. of Germany

[21] Appl. No.: 575,350

[22] Filed: Aug. 30, 1990

[30] Foreign Application Priority Data

Aug. 31, 1989 [DE] Fed. Rep. of Germany ....... 3928816
Mar. 9, 1990 [DE] Fed. Rep. of Germany ....... 4007506

[51] Int. Cl.$^5$ .............................................. F16H 3/08
[52] U.S. Cl. ................................... 192/93 A; 74/337.5
[58] Field of Search ............... 192/93 A; 74/337.5, 74/365, 375

[56] References Cited

U.S. PATENT DOCUMENTS

| | | |
|---|---|---|
| 4,463,622 | 8/1984 | Freiburger ........................ 74/337.5 |
| 4,674,347 | 6/1987 | Nishida et al. .................. 192/93 A |
| 4,690,258 | 9/1987 | Teraoka et al. ................. 192/93 A |

FOREIGN PATENT DOCUMENTS

| | | |
|---|---|---|
| 58-146723 | 9/1983 | Japan ............................... 192/93 A |
| 1582237 | 9/1976 | United Kingdom . |

Primary Examiner—Leslie A. Braun
Assistant Examiner—Nicholas Whitelamb
Attorney, Agent, or Firm—Toren, McGeady & Associates

[57] ABSTRACT

A gearbox comprising two shafts (20, 27) with their axes parallel to one another and at least two pairs of gear wheels each pair comprising a wheel (38) on one of the shafts permanently in mesh with a wheel (45) on the other shaft, the wheels (45) on one of the shafts being connectable to the shaft by friction clutches, and actuating means disposed between adjacent friction clutches to selectively engage one or other of them; the actuating means comprising two pressure rings (2) and an adjusting ring (1) disposed between them, adjusting rings (5) for causing relative angular movement between the adjusting ring and pressure rings, and opposed pairs of grooves (21, 22) in the facing surfaces of the adjusting ring and pressure rings. Angular movement of the adjusting ring in one direction relative to the pressure rings causes axial movement of one pressure ring to operate on its adjacent friction clutch, while angular movement of the adjusting ring in the other direction causes axial movement of the other pressure ring to operate on the other friction coupling.

21 Claims, 9 Drawing Sheets

GEAR BOX WITH GEARS SHIFTABLE UNDER LOAD

BACKGROUND TO THE INVENTION

1. Field of the Invention

This invention relates to a gearbox comprising at least two parallel shafts carrying gear wheels permanently meshing with one another in pairs, one gear wheel of each pair being connectable to its associated shaft for torque transmission by a friction clutch which is engagable by an actuating means which operates axially on the clutch.

2. Description of Prior Art

Conventional automatic gearboxes comprising planetary gears, preferably with four speed ratios and with highest gears which are partly or completely direct driven (i.e. with the torque convertor wholly or partly switched off), meet the highest standards of economy and driving comfort. However, such gearboxes are technically complicated and expensive to manufacture.

Double-clutch gearboxes which, in principle, are designed like conventional manual gearboxes are able to shift gear ratio without interruption of power transmission. Shifting is effected by a double clutch arrangement and a shaft assembly comprising a hollow shaft and an inner shaft, which makes such gearboxes technically complex.

Conventional manual gearboxes can be automated, with clutch operation automatically controlled and operated in coordination with gear shifting. However, the coordination of clutch operation and gear shifting is difficult to control, and a disadvantage of such a gearbox is that power transmission must be interrupted for gear shifting.

GB-1582237 discloses an automatic gearbox wherein gear shift sleeves are replaced by hydraulically operated friction clutches, the hydraulic medium being supplied through bores extending axially in the gear shafts. However, the control of such supply of hydraulic medium is too complex for cost-effective production and trouble free operation.

SUMMARY OF THE INVENTION

It is the object of the present invention to provide a multi-ratio gearbox with the gears shiftable under load, and which, with minimum modification, may be accommodated in a conventional gearbox housing, and which can be less expensive to produce than conventional automatic gearboxes or continuously variable transmissions.

According to the invention, we provide a gearbox comprising two shafts disposed in a housing with their axes parallel to one another; at least two pairs of gear wheels, each pair comprising a wheel on one of the shafts permanently in mesh with a wheel on the other shaft; the wheels on one of the shafts being connectable to the shaft for torque transmission by respective friction clutches; and an actuating means disposed between two adjacent friction clutches for selectively causing engagement thereof, the actuating means comprising:

two pressure rings respectively operable axially on the friction clutches by way of thrust bearings, the pressure rings being rotatable and movable axially relative to the associated shaft;

an adjusting ring disposed between the pressure rings, the adjusting ring being rotatable and axially fixed relative to the associated shaft;

adjusting means for causing relative angular movement, about the shaft axis, between the adjusting ring and the pressure rings;

each side of the adjusting ring and the adjacent pressure ring having opposed faces provided with circumferentially extending grooves, arranged as at least three opposed pairs of grooves, including portions of varying depth; and rolling members disposed one in each opposed pair of grooves;

the grooves on one side of the adjusting ring and the adjacent pressure ring being arranged so that relative angular movement of the adjusting ring and pressure ring in one direction, from a starting position thereof, causes axial movement of the pressure ring away from the adjusting ring to operate on the adjacent friction clutch, whilst relative angular movement of the rings in the opposite direction from the starting position does not cause said axial movement of the pressure ring;

and the grooves on the other side of the adjusting ring and the other pressure ring being arranged so that said relative angular movement in the opposite direction from the starting position causes axial movement of said other pressure ring away from the adjusting ring to operate on the other friction clutch whilst relative movement in the first direction from the starting position does not cause said axial movement of said other pressure ring.

In a gearbox according to the invention, the gear wheels on one of the gearbox shafts are selectively connected to the shaft not by synchronising devices nor by mechanical interfitting, but by the friction clutches. The actuating means for the friction clutches, in which relative angular movement is caused between the adjusting ring and pressure rings, is relatively simple, and may be operated by, for example, electric motors which may be attached to the gearbox housing. Worm gearing may be used to cause the required relative angular movement of the adjusting rings. However, as an alternative to the use of electric motors and gearing, thrust rods extending tangentially to the adjusting rings and operable electrically, hydraulically or pneumatically may be used. With one actuating means provided between two friction clutches and operable to engage one or other of the friction clutches as desired, the number of actuating means required in a complete gearbox is kept to a minimum.

Usually the required relative angular movement between the adjusting ring and pressure rings in the actuating means is achieved by the adjusting means which moves the adjusting ring angularly, whilst the pressure rings are non-rotatably held in the gearbox housing. However, it would be possible to move the pressure rings angularly within the housing while the adjusting ring remains non-rotatingly stationary. Pressure rings on opposite sides of an adjusting ring could, if required, be actuated independently of one another.

In one advantageous embodiment described hereafter, the adjusting ring has its periphery provided with teeth, engaged by a worm gear provided on a shaft extending tangentially relative to the adjusting ring and drivable by an electric motor. The assembly of electric motor, shaft and worm gear is supported at the electric motor by being connected to the gearbox housing, whilst adjacent the adjusting ring it has jaws which engage circumferentially extending grooves of the adjusting ring, to hold the worm gear radially relative to the adjusting ring to resist forces which act between the adjusting ring and worm gear in use.

In another embodiment described hereafter, an electric motor is arranged to move the adjusting ring angularly by way of a train of spur gears engaging teeth on the periphery of the adjusting ring. In this embodiment also, the train of gears may be supported radially relative to the adjusting ring. Yet another possibility is that a chain drive could be utilised.

It has been found that it is advantageous if the current supplied to an electric motor for operating the adjusting ring is pulsed, which considerably reduces the hysteresis losses when increasing and decreasing the axial pressure on the friction clutches. In consequence, simultaneous disengagement and engagement of two friction clutches operable by separate actuating means is easy to achieve. Furthermore, pulsed control of the current provides a very economical basis for the electronic control of two electric motors to be actuated simultaneously.

Where the pressure rings are prevented from rotation relative to the housing of the gearbox, they may be axially guided by a tongue and groove arrangement which, during assembly, is fitted from the outside of the gearbox housing.

The gearbox housing may be provided with apertures into which the adjusting assemblies for the adjusting rings are inserted from the outside of the housing and by which the apertures are closed. The electric motor for adjusting the actuating means may be provided with a brake which is brought into effect when the electric motor is not under power, to hold the mechanism in a position wherein it has been set. When power is supplied to the motor, the brake is released. Such a brake may be an electromagnetically actuated spring brake which is fitted either directly to the electric motor or is incorporated in its drive to the adjusting ring.

If such a brake is not fitted, the configuration of the grooves in the adjusting ring and pressure rings has to be such that self-inhibition against relative rotation therebetween occurs, or such self-inhibition has to be provided by the gearing connecting the motor to the adjusting ring.

BRIEF DESCRIPTION OF DRAWINGS

These and other features of the invention will now be described by way of example with reference to the accompanying drawings, of which.

DESCRIPTION OF PREFERRED EMBODIMENTS

Figure 1:
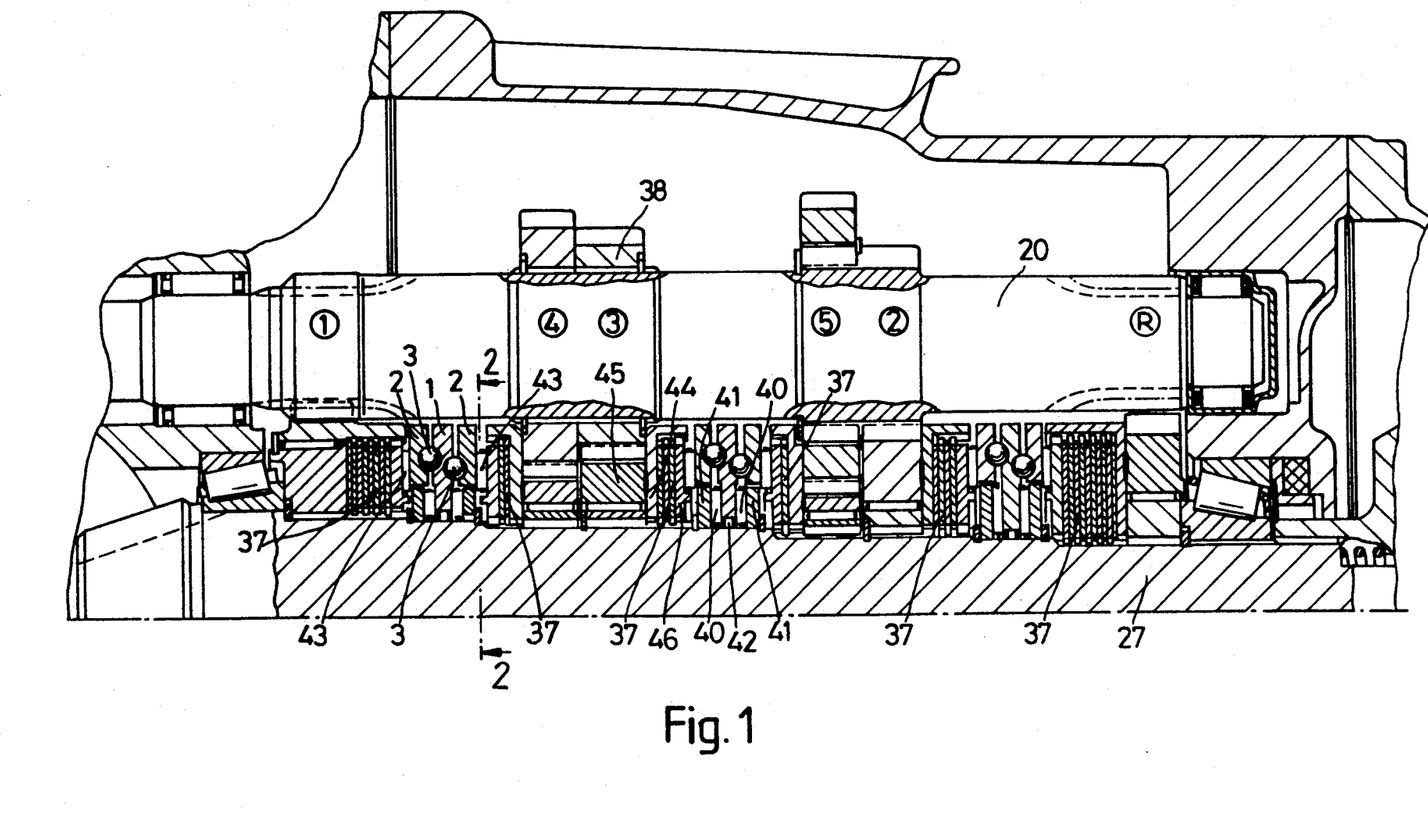
FIG. 1 is a sectioned view of part of a gearbox according to the invention.

Referring firstly to FIG. 1 of the drawings, this shows, partly in section, part of a gearbox according to the invention. It comprises a housing within which are disposed two shafts with axes which are parallel to one another, namely an input shaft 20 and an output shaft 27. The shafts carry gear wheels which are permanently in mesh with one another in pairs to provide five forward gear ratios, as indicated by the numbers ①  to ⑤ along the shaft 20. The shaft 10 is also provided with gear teeth which mesh through an intermediate gear, not shown, with a gear wheel on the shaft 27 as indicated at Ⓡ, to provide a reverse gear. The gear wheels on the shaft 27 are selectively connectable to the shaft, for torque transmission, by friction clutches, so that the gearbox provides the required ratio according to which gear is connected to the shaft 27 by its friction clutch. Each of the gears on the shaft 27 has its own friction clutch associated therewith, and actuating means for engaging the friction clutches as required are provided one between each adjacent pair of friction clutches; i.e. there are three actuating means disposed along the shaft 27. This disposition of the actuating means is analogous to the disposition of synchronising ring sliding sleeves in a conventional manual gearbox.

It is preferred that, as illustrated, the friction clutches and their associated actuating means are disposed on the shaft which is lowermost in the gearbox housing, so that they will be adequately lubricated from oil provided in the gearbox housing. Furthermore, in the illustrated embodiment the pinions for the first gear and reverse gears are integrated in the input shaft 20, so that it is easier to arrange the actuating means on the output shaft.

Each of the actuating means, to be described hereafter, for the friction clutches is not capable of causing engagement of its two friction clutches directly one after the other without passing through a position in which neither clutch is engaged. For this reason, the illustrated arrangement of the gearwheels is used to provide for the possibility of gear shifting under load without interruption of power transmission. Suitable control means would provide for substantially simultaneous disengagement of one gear by one actuating means and engagement of another gear by another actuating means.

First gear and reverse gear should be positioned as in a conventional manual gearbox, in a region where the bending loads on the shaft 20 provided with the integral teeth are lowest. Second, third, fourth and fifth gear therefore should be associated with the actuating means for the friction clutches. Second gear should be controlled by the same actuating mechanism as reverse gear, because it is the lowest of the four gears in question. In this way, the possibly dangerous effect of mistakingly shifting directly from the associated forward into reverse gear of a moving vehicle is minimised. Of third, fourth and fifth gear, only third and fifth may be controlled by the same actuating means, which is the reason why fourth gear is controlled by the same actuating means as first gear.

A four speed gearbox, with reverse gear, also requires three actuating means for its friction clutches, unless reverse gear is operated manually in which case only two actuating means are necessary.

The friction clutches associated with the gear wheels provided on the output shaft 27 are the same as each other in principle, although differing in detail in respect of the number of friction plates provided in each clutch, determined in dependence on the gear ratio, engine torque, and permissible friction plate pressure. For the third gear ratio in the gearbox shown in FIG. 1, comprising gear wheel 38 on input shaft 20 and gear wheel 45 on output shaft 27, the gear wheel 45 being supported on a bearing on its shaft, a friction plate housing 44 is connected to the gear wheel 45 and accommodates a pack of friction plates 37 of which alternate ones are respectively rotationally fast with the housing 44 and shaft 27 by having splined engagement therewith. A pressure plate 46 is arranged to press on the pack of friction plates to urge them into frictional engagement with one another and thus couple the gear wheel 45 to the shaft 27.

Each of the actuating means disposed between two adjacent friction clutches comprises an adjusting ring 1 disposed between two pressure rings 2. The adjusting ring and pressure rings are rotatable relative to the shaft 27, and the adjusting ring is axially fixed relative to the shaft 27 by being constrained between abutment rings 41 with the intermediary of thrust bearings 40. A radial bearing 42 supports the adjusting ring relative to the shaft 27. Each side of the adjusting ring 1 and the facing sides of the pressure rings 2 have facing pairs of circumferentially extending grooves wherein are received balls 3, and the configuration of the grooves is such that when relative angular movement about the axis of shaft 27 occurs between the adjusting ring and pressure ring, one or other of the pressure rings, according to the sense of the relative angular movement therebetween, is moved axially to urge the associated friction clutch into engagement. Typically, three balls and sets of grooves are provided for each pressure ring, but depending on the loads involved and the ball diameter, a larger number of balls and grooves could be utilised. Thrust bearings 43 are interposed between the pressure rings 2 and pressure plates 46 of the friction clutches.

Preferably, as in the illustrated embodiments, the pressure rings 2 are held against rotation relative to the housing of the gearbox. The relative angular movement between the pressure rings and adjusting ring is achieved by moving the adjusting ring as described hereafter. However, it would be within the scope of the invention if the adjusting ring were to be held against angular movement within the gearbox housing, whilst the pressure rings are angularly movable.

Figure 2:
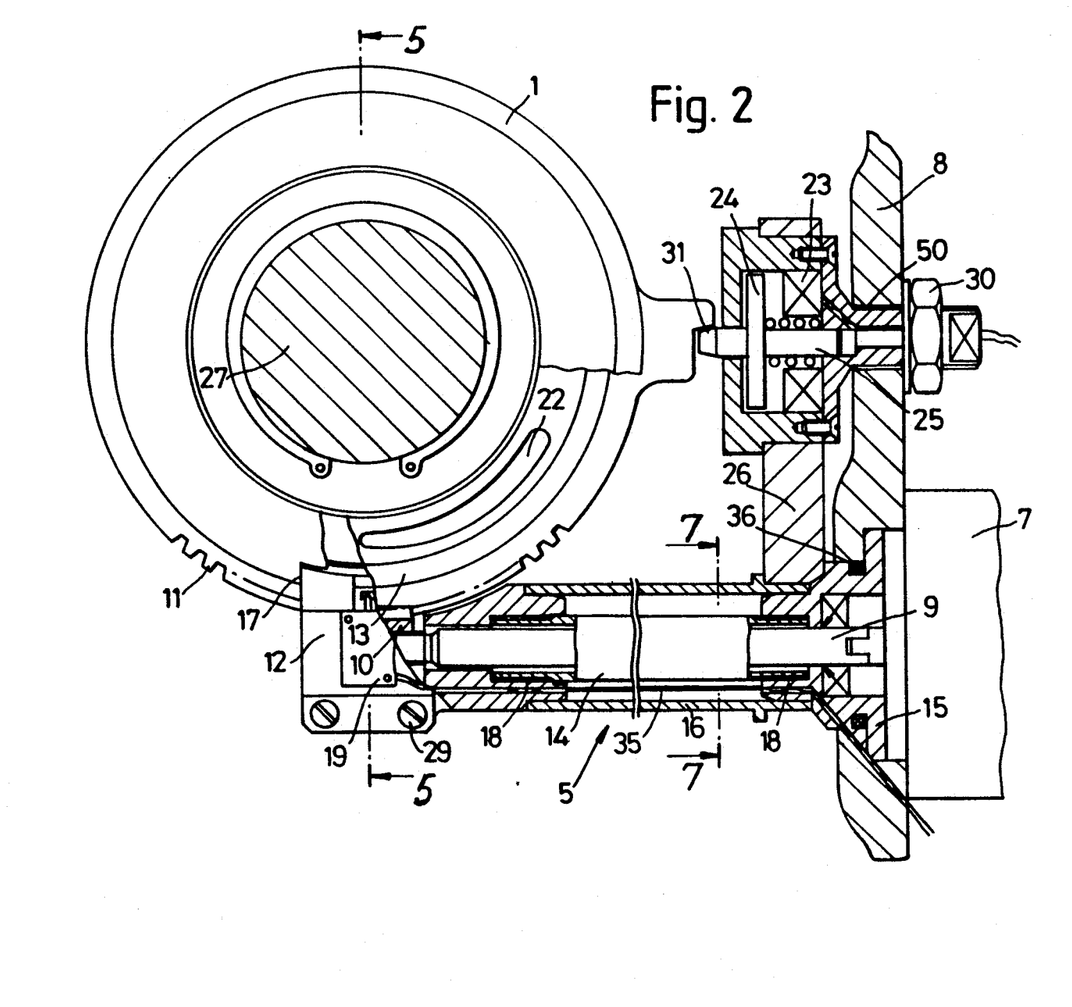
FIG. 2 is a section on the line 2-2 of FIG. 1, through one of the actuating means of the gearbox.
Figure 3:
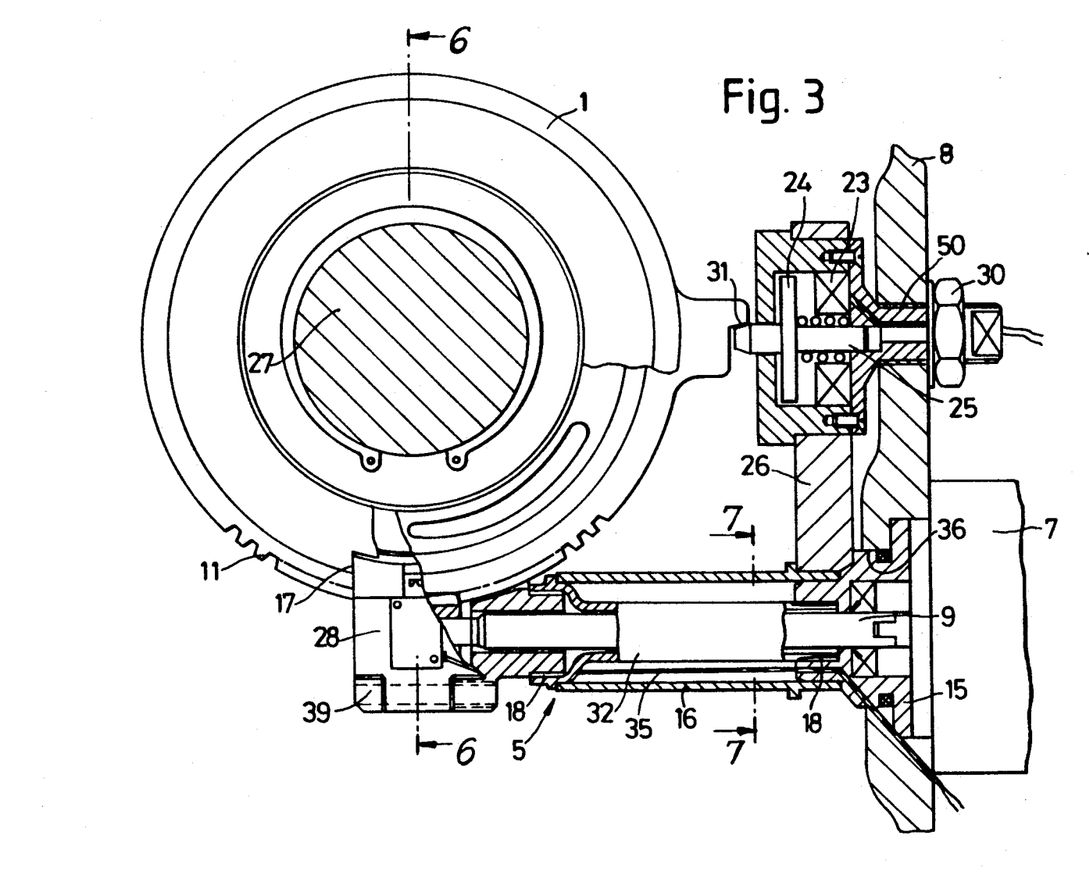
FIG. 3 is a view as FIG. 2, but showing an alternative design of actuating means.

FIGS. 2 and 3 show two embodiments of adjusting means 5 for moving the adjusting ring 1 angularly, the embodiments differing slightly from one another in detail. Both these embodiments comprise an electric motor 7 fitted to an aperture in the gearbox housing wall indicated at 8. The shaft 9 of the electric motor is extended and provided with a worm gear 10 which meshes with teeth 11 provided on the periphery of the adjusting ring 1. The worm gear is supported in a housing 12 (FIG. 2) or 28 (FIG. 3), which is supported relative to the adjusting ring 1 by having formations engaging in grooves 13 on opposite sides of the adjusting ring adjacent its periphery. The worm gear housing 12 or 28 is prevented from moving tangentially relative to the adjusting ring by a tubular connecting housing 14 (FIG. 2) or 32 (FIG. 3) which has screw-threaded connection at 18 with the housing 12 or 28 on the one hand and a flange component 15 which supports the electric motor 7, on the other hand. The housing 12 or 28 engages the pressure rings 2 to prevent the latter from rotating, cooperating with stop formations 17 thereof. An external protective tube is indicated at 16, and a housing reaction support at 26.

Figure 5:
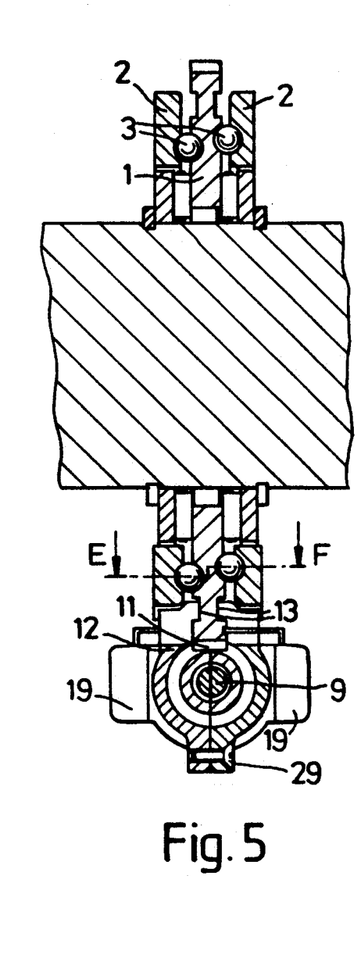
FIG. 5 is a section through the actuating means of FIG. 2, on the line 5—5 thereof.
Figure 6:
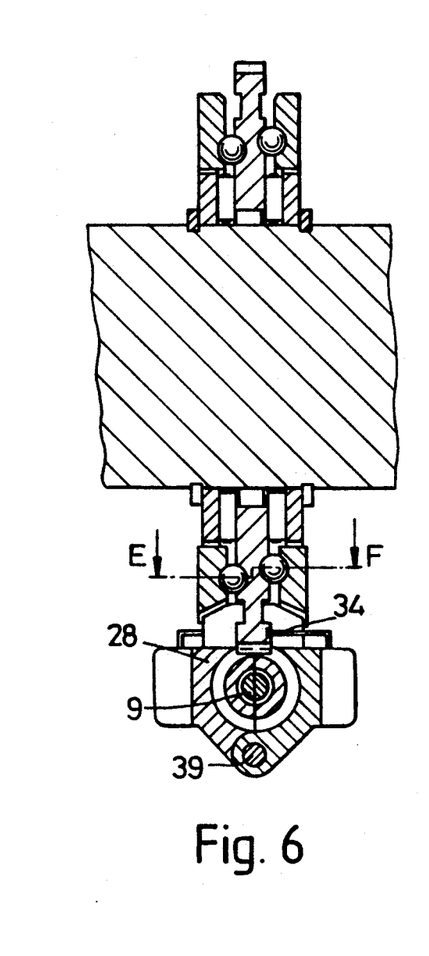
FIG. 6 is a section through the actuating means of FIG. 3, on the line 6—6 thereof.
Figure 7:
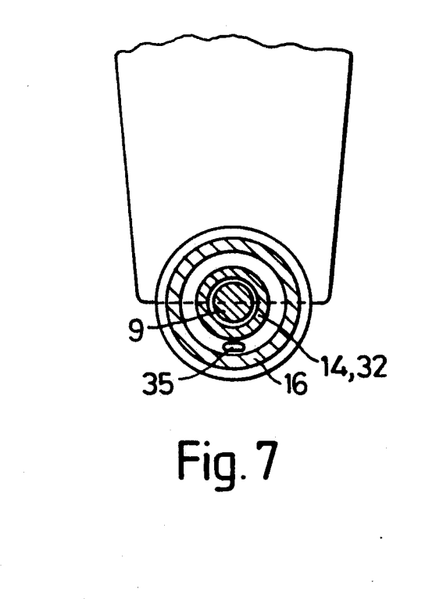
FIG. 7 is a section on the line 7—7 of FIG. 2 or 3.

The pinion housing 12 shown in FIGS. 2 and 5 is in two parts held together by screws 29. The housing 28 in FIGS. 3 and 6 comprises two halves pivoted together by a pin 39. In the latter case, it is possible to replace the housing by working through aperture 36 in the gearbox housing 8, with the help of special tools.

Figure 8:
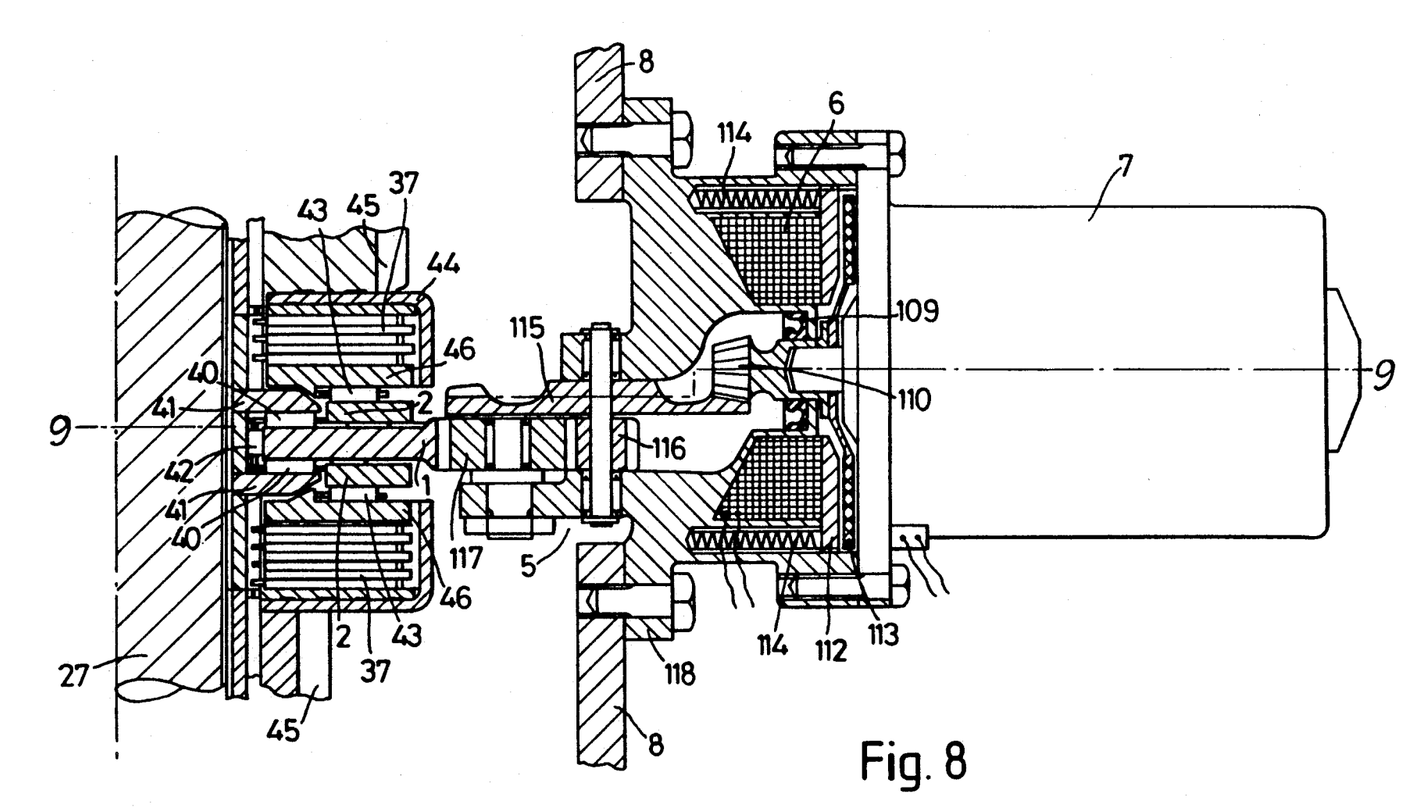
FIG. 8 is a section through part of another embodiment of actuating means for the gearbox.
Figure 9:
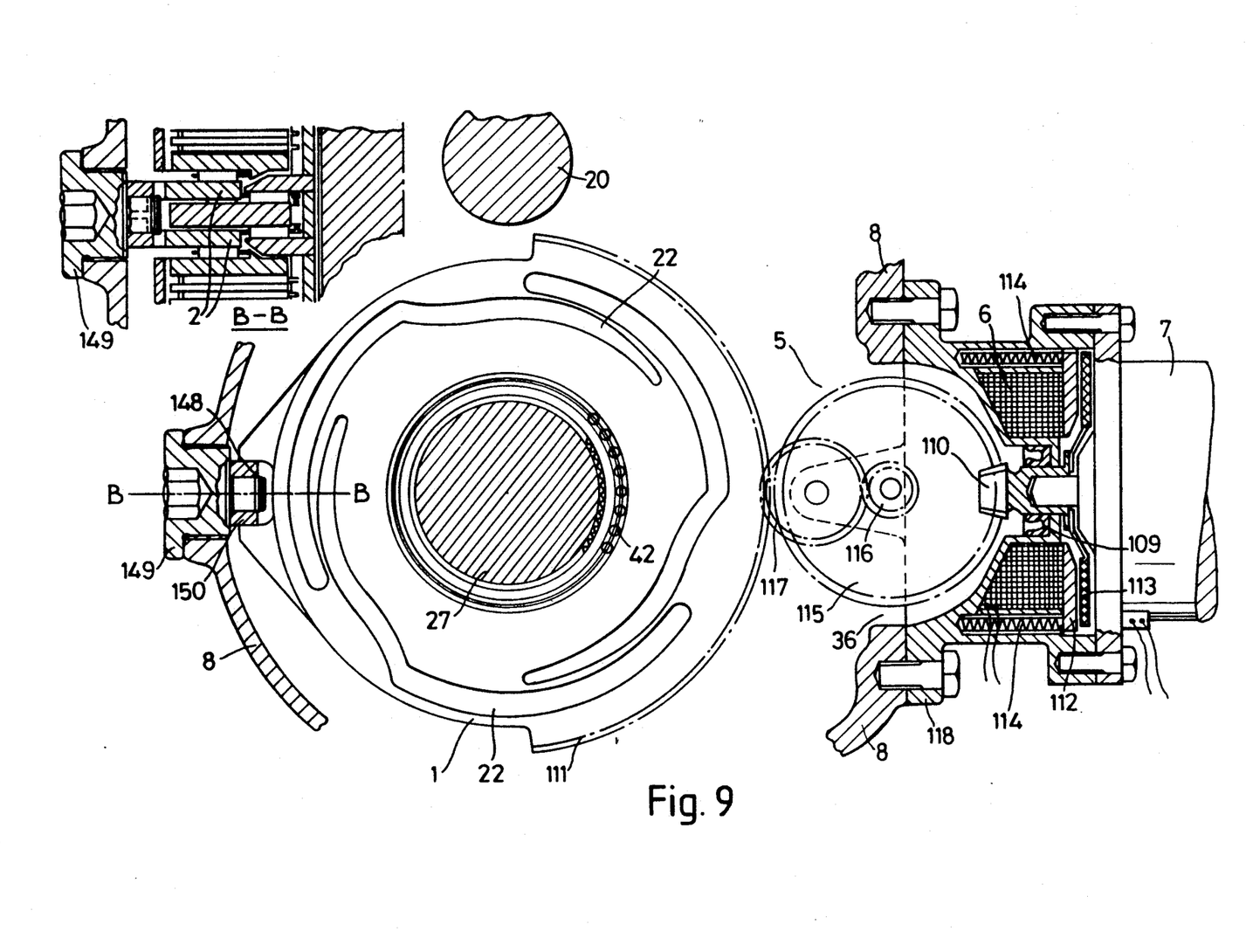
FIG. 9 is a transverse section through the actuating means of FIG. 8, on the line 9—9 thereof.

FIGS. 8 and 9 show an alternative arrangement of adjusting mechanism 5 for causing angular movement of the adjusting ring 1 relative to the pressure rings 2. FIG. 8 also shows clearly the arrangement of two adjacent friction clutches, pressure rings, bearings and other associated parts, identified by the same reference numerals as used previously.

FIGS. 8 and 9 show an electric motor 7 fitted to a housing 118 which in turn is fitted to the housing of the gearbox, part of which is indicated at 8. The shaft of the electric motor 7 is provided with a bevel pinion 110 which engages the bevel teeth of a crown wheel 115. A seal 109 engaging the pinion 110 isolates the electric motor and brake to be described hereafter from the interior of the gearbox housing. The crown wheel 115 carries a spur gear 116 which meshes with an intermediate gear 117 in turn meshing with teeth 111 on part of the periphery of adjusting ring 1. The crown wheel 115, spur gear 116, and intermediate gear 117 are all carried by an extension of the housing 118. The housing 118 contains an electrical coil 6 which is arranged to be energised at the same time as the electric motor 7 is energised. When the coil 6 is energised it attracts to it a braking element 112 which, when the coil is not energised, is urged by compression springs 114 into engagement with a brake disc 113 provided on the shaft of the electric motor. Thus, when the electric motor 7 is not energised to cause angular movement of the adjusting ring 1, in either direction, it is braked so that the adjusting ring holds the position in which it has been set.

An alternative driving and braking adjuster system combined into one unit, can incorporate a Piezo wandering-wave electric motor. This exerts relatively high torque at low speed compared with a conventional D.C. motor. This permits a reduced level of gear reduction between the motor and the adjuster ring. When not energised it is a self-braking unit. Furthermore it is compact in length and is therefore mountable within tighter space restrictions between the gearbox and the vehicle chassis or sheet-metal floor.

FIG. 9 and its inset clearly show how the pressure rings 2 of the actuating means are prevented from rotating relative to the gearbox housing by a stop member 148 with a guide sleeve 150, held to the gearbox housing 8 by a screw plug 149.

The configuration of the facing pairs of grooves on the opposite faces of the adjusting ring 1 and the faces of the pressure rings 2 will now be described, with reference particularly to FIGS. 10 and 11. The configuration of these grooves is such that, from a starting intermediate angular position of the adjusting ring relative to the pressure rings, relative movement of the adjusting ring in one direction will cause axial movement of one pressure ring away from the adjusting ring to urge the associated friction clutch into engagement, whilst having no effect on the axial position of the other pressure ring. Relative movement of the adjusting ring in the other direction causes the other pressure ring to move axially and urge the other associated clutch into engagement, whilst having no effect on the first said pressure ring.

Figure 10:
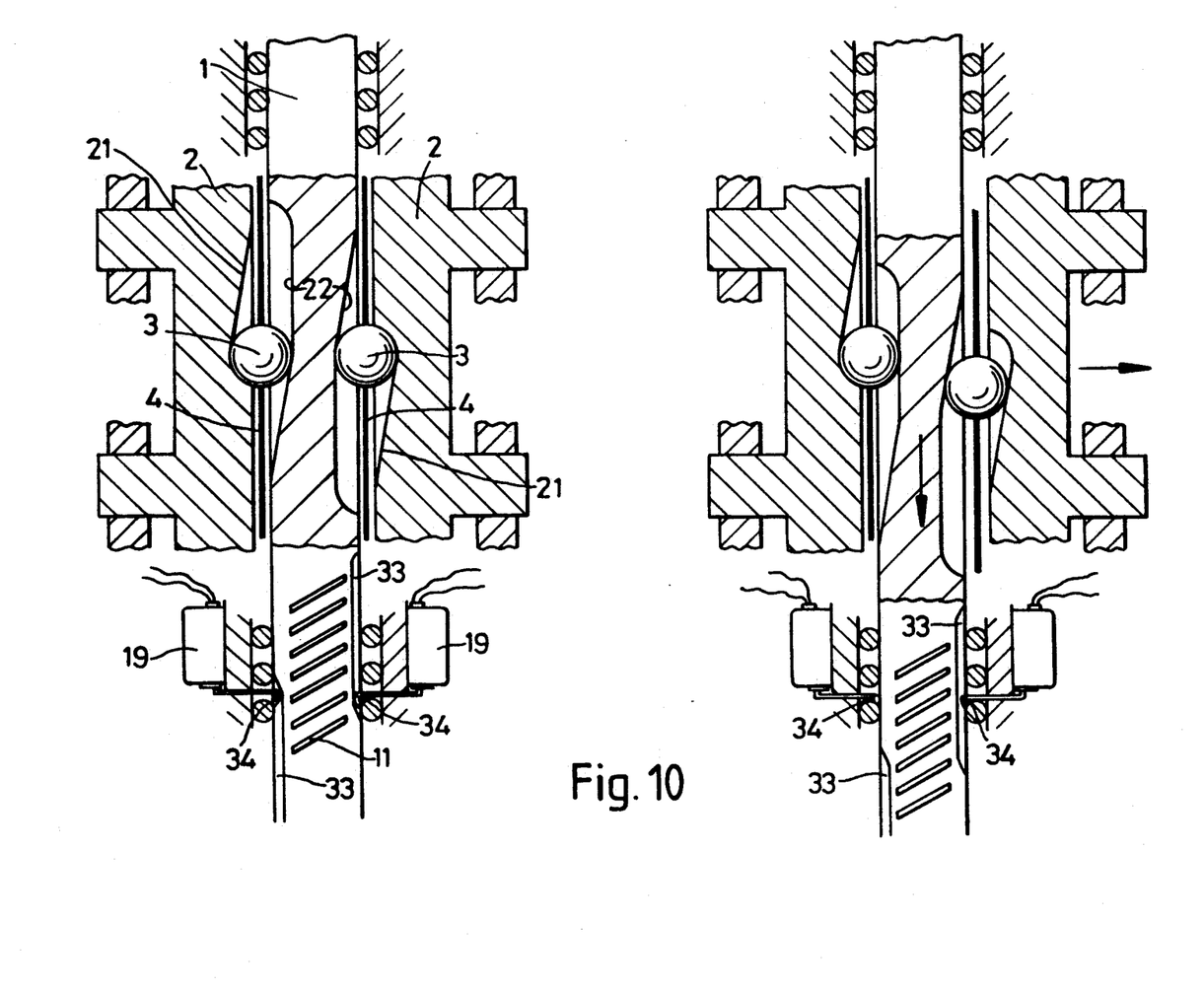
FIG. 10 shows, in two views, the operation of the actuating means for the gearbox.
Figure 11:
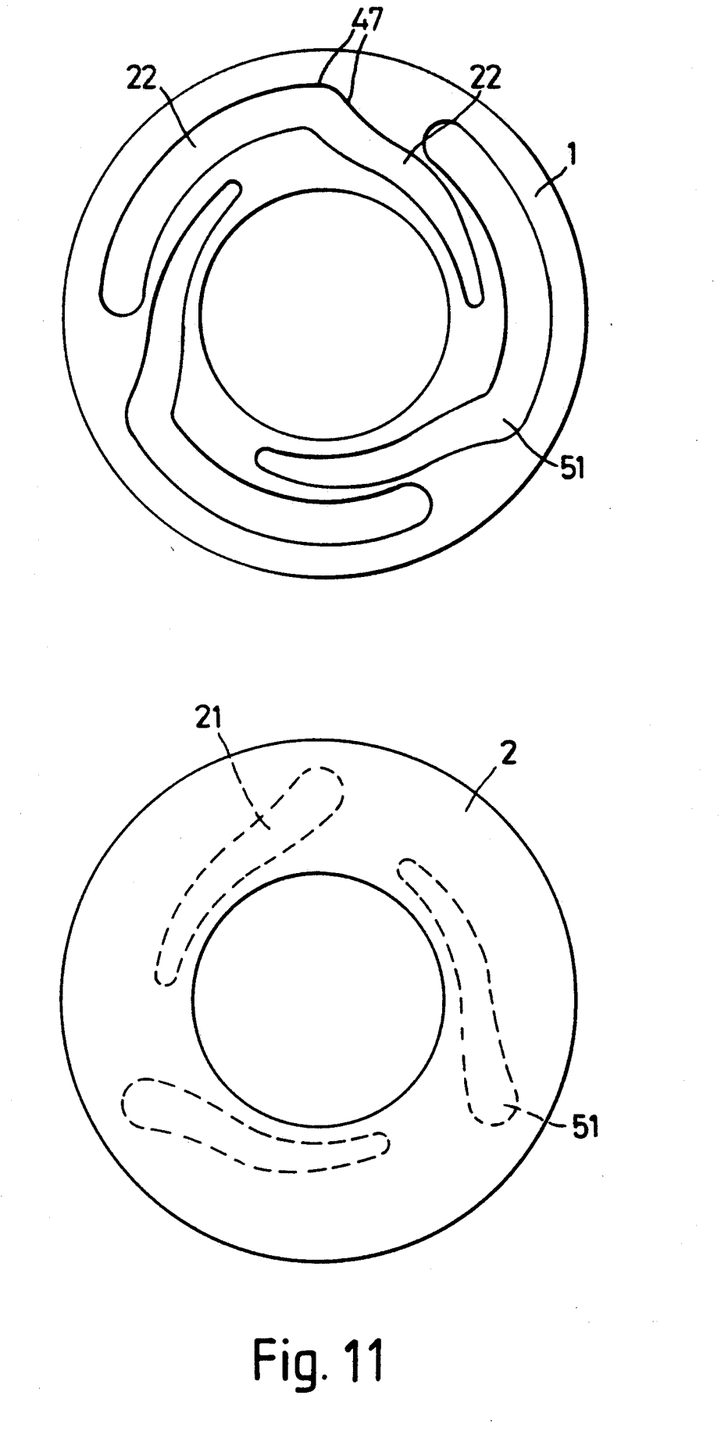
FIG. 11 shows the arrangement of grooves in the actuating means.

As seen in FIG. 10, the grooves 21 in the pressure rings 2 have a change in depth in the form of a conventional ramp, i.e. starting from a maximum groove depth, which at the same time serves as a stop for the ball engaging therein, they decrease in depth at a constant angle as they extend circumferentially.

The grooves 22 in the adjusting ring, however, each comprise a first portion 22' which is a mirror image of the opposed groove 21. A second portion 22" of each groove 22 has a constant depth as it extends circumferentially starting from the end of greatest depth of the first portion 22'. This provides the above described axial displacement of one or other pressure ring, according to which way the adjusting ring is relatively moved angularly from its starting position.

Generally it is desirable that the angle through which the adjusting ring has to be displaced relative to the pressure rings is more than 60° in both directions from its starting or intermediate position. Because there are three balls 3 engaged in the grooves 21, 22, it is necessary to provide that the grooves 21 and/or 22 should overlap one another circumferentially, as illustrated in FIG. 9 and FIG. 11. In FIG. 11, it can be seen how the portions 22' of grooves 22 in the adjusting ring 1 extend to a smaller radius on the adjusting ring as they extend circumferentially in one direction from the starting position 51, whilst the portions 22" of the grooves extend in the opposite circumferential direction at a constant radius from their starting positions 51. The grooves 21 in the pressure rings 2 extend radially as they extend circumferentially, in mirror image of the groove portions 22'. The grooves 21 and groove portions 22' are designed so that the balls engaged therein cannot become jammed.

The rate of change of depth of the groove portions 22' and grooves 21 may vary, being initially high and then progressively decreasing. In the first part of relative movement of the adjusting and pressure rings, where a low but progressively increasing axial load is applied to the friction clutch, the rate of movement of the pressure ring is relatively high, but this decreases in a second region, allowing for the possibility of wear in the plates of the friction clutch.

The balls 3 are disposed in apertures in annular cages 4 between the adjusting and pressure rings, to ensure that the balls move in synchronism with one another along the grooves in the rings.

The current supplied to the electric motors which move the adjusting rings relative to the pressure ring may be modulated, inter alia, to cause the balls gently to move against stop portions 47 at the central positions of the grooves 22. Preferably, the required central or starting positions of the adjusting rings are indicated by switches associated therewith. In FIG. 2, microswitches 19 are shown attached to the housing 12 of the worm gear for moving the adjusting ring. Wiring leading to such switches is indicated at 35. As shown in FIG. 10, the microswitches have sensing arms 34 which slide on the flanks of the adjusting ring 1 and are engagable with indentations 33 therein to indicate the starting position of the ring.

Figure 4:
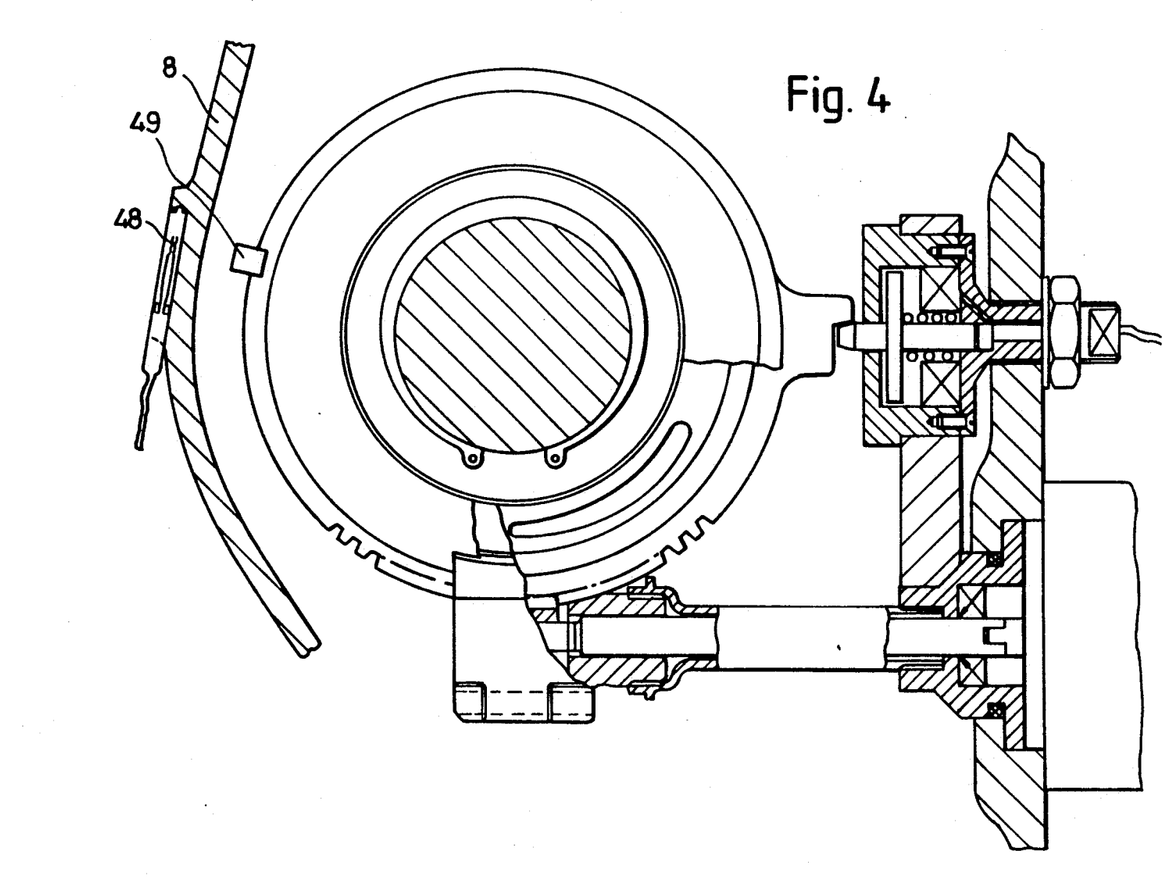
FIG. 4 is a view as FIG. 3, but showing yet another alternative design of actuating means.

FIG. 4 shows that a magnetically operated reed switch 49 may be fitted to the outside of the gearbox housing if it is of aluminum, to be operated by a magnet 49 fixed to the ring 1.

The axial force exerted on to the respective plate package is obtained from the formula:

$$\text{force } K = \frac{M \cdot i}{r \cdot \tan(\alpha + \phi)}$$

M = torque of electric motor
i = gear ratio between motor and adjusting ring
r = radius of spreading ball track
$\alpha$ = ball track ramp angle
$\phi$ = ball/track friction angle Preferably the current supplied to the electric motor is pulsed so that the torque thereof pulsates, e.g. with a frequency from 5 to 50 Hz, so that the effective friction angle $\phi$ between the balls and grooves is very small. This means that the relationship between the axial force exerted on the friction clutch and the current of the electric motor is almost the same whether the force on the friction clutch is being increased or decreased.

To make it impossible to engage reverse gear by mistake when the vehicle is in use, a locking device for manual operation may be provided in association with the reverse gear. FIGS. 2 and 3 show an electro-magnetic device which prevents movement of the adjusting ring 1 in one direction from its starting position, and this could be used to prevent the unwanted engagement of reverse gear. Release of the device could be effected by an electrical switch operated by the gear lever. FIGS. 2 and 3 show an electromagnet 23 operable on an armature 24 to retract a stop member 31. Radial setting of the stop member 31 is effected by mounting the device in a threaded bore 50 in the gearbox housing 8, locked by a locknut 30. Rotational setting of the stop is achieved by the fact that the armature 24, stop member 31 and guide shaft 25 are eccentrically arranged relative to the threaded bore 50.

In the gearbox described, shifting of gears under power is possible in the following sequences:

If the gear design deviates from FIG. 1, e.g. if there is a common adjusting assembly for the gear wheel pairs of gears 1 and 4, 5 and 2 as well as 3 and the reverse gear, then there is an additional possibility of skipping the fourth gear as follows:

In contrast to the above, a double clutch gearbox with gear changing under load does not allow one or the other gear to be skipped.

Gear changing is either controlled by the engine characteristics (fully automatic system) or by a manual lever.

The "N" position (neutral) of the gearbox can be achieved by a conventional sliding sleeve fitted between the engine and gearbox. The "P" position (parking) of the gearbox is designed as a conventional engaging mechanism.

I claim:

1. A gearbox comprising two shafts disposed in a housing with their axes parallel to one another; at least two pairs of gear wheels, each pair comprising a wheel on one of the shafts permanently in mesh with a wheel on the other shaft; the wheels on one of the shafts being connectable to the shaft for torque transmission by respective friction clutches; and an actuating means disposed between two adjacent friction clutches for selectively causing engagement thereof, the actuating means comprising:

two pressure rings respectively operable axially on the friction clutches by way of thrust bearings, the pressure rings being rotatable and movable axially relative to the associated shaft;

an adjusting ring disposed between the pressure rings, the adjusting ring being rotatable and axially fixed relative to the associated shaft;

adjusting means for causing relative angular movement, about the shaft axis, between the adjusting ring and the pressure rings;

each side of the adjusting ring and the adjacent pressure ring having opposed faces provided with circumferentially extending grooves, arranged as at least three opposed pairs of grooves, including portions of varying depth; and rolling members disposed one in each opposed pair of grooves;

the grooves on one side of the adjusting ring and the adjacent pressure ring being arranged so that relative angular movement of the adjusting ring and pressure ring in one direction, from a starting position thereof, causes axial movement of the pressure ring away from the adjusting ring to operate on the adjacent friction clutch, whilst relative angular movement of the rings in the opposite direction from the starting position does not cause said axial movement of the pressure ring;

and the grooves on the other side of the adjusting ring and the other pressure ring being arranged so that said relative angular movement in the opposite direction from the starting position causes axial movement of said other pressure ring away from the adjusting ring to operate on the other friction clutch whilst relative movement in the first direction from the starting position does not cause said axial movement of said other pressure ring.

2. A gearbox according to claim 1 wherein the adjusting means comprises means for moving the adjusting ring angularly, while the pressure rings are held against angular movement relative to the gearbox housing.

3. A gearbox according to claim 2 wherein the adjusting means is fixed to the gearbox housing and includes guide means engaging with circumferential grooves in the adjusting ring to hold it radially relative thereto.

4. A gearbox according to claim 1 or claim 2 wherein the adjusting means includes a shaft extending tangentially relative to the angularly movable ring, and a worm gear thereon engaging teeth on the periphery of the ring.

5. A gearbox according to claim 1 wherein the adjusting means includes a length-adjustable support member for adjustment relative to the gearbox housing.

6. A gearbox according to claim 1 wherein the adjusting means includes a train of gears.

7. A gearbox according to claim 1 wherein the adjusting means includes a motor and a brake which is released when the motor is actuated.

8. A gearbox according to claim 1 wherein the adjusting means includes an electric motor disposed on the outside of the gearbox housing, the adjusting means being removable from the housing as a unit with said motor.

9. A gearbox according to claim 1 wherein the configuration of said grooves, and/or the adjusting means, provides for self-inhibition of relative angular movement between the adjusting ring and pressure rings.

10. A gearbox according to claim 1 wherein the adjusting means comprises an electric motor.

11. A gearbox according to claim 1 comprising means for detecting said starting position of the adjusting ring relative to the pressure rings.

12. A gearbox according to claim 1 wherein said grooves provide, for relative angular movement of the pressure rings and adjusting rings at a constant rate from the starting position thereof, an initially high and then lower rate of axial movement of the pressure rings.

13. A gearbox according to claim 12 wherein said grooves include regions of constant depth which do not produce axial movement of the respective pressure rings.

14. A gearbox according to claim 13 wherein, from a starting position, said grooves include portions extending radially as they extend circumferentially.

15. A gearbox according to claim 1 wherein one of said gear wheels provides a reverse gear, and there is provided a releasable blocking member for blocking said relative angular movement between the adjusting ring and pressure rings in a direction which would cause engagement of the friction clutch of said reverse gear wheel.

16. A gearbox according to claim 1 wherein said friction clutches include housings connected directly to the gear wheels.

17. A gearbox according to claim 1 wherein the rolling members comprise balls circumferentially constrained by cages.

18. A gearbox according to claim 1 wherein said adjacent friction clutches operable by the actuating means comprise non-adjacent gear ratios in the gearbox.

19. A gearbox according to claim 10 comprising means for pulsing the supply of current to the electric motor.

20. A gearbox according to claim 1 comprising a plurality of actuating means for friction clutches, and control means operable on said actuating means to cause substantially simultaneous disengagement of one gear by one actuating means and engagement of a new gear by another actuating means.

21. A gearbox according to claim 10 wherein the electric motor comprises a Piezo wandering-wave electric motor.

* * * * *